United States Patent
Beeston et al.

(10) Patent No.: US 7,337,262 B2
(45) Date of Patent: Feb. 26, 2008

(54) ADAPTIVE READ AHEAD METHOD OF DATA RECORDED ON A SEQUENTIAL MEDIA READABLE VIA A VARIABLE DATA BLOCK SIZE STORAGE DEVICE

(75) Inventors: Ralph T. Beeston, Tucson, AZ (US); Cory G. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/119,968

(22) Filed: May 2, 2005

(65) Prior Publication Data
US 2006/0248278 A1 Nov. 2, 2006

(51) Int. Cl.
*G06F 12/00* (2006.01)
(52) U.S. Cl. .................... 711/4; 711/137; 711/154; 711/100
(58) Field of Classification Search ............ 711/4, 711/100, 137, 154
See application file for complete search history.

(56) References Cited

U.S. PATENT DOCUMENTS

| | | | |
|---|---|---|---|
| 4,210,961 A | | 7/1980 | Whitlow et al. |
| 4,435,762 A | | 3/1984 | Milligan et al. |
| 5,608,875 A | * | 3/1997 | Mori .................. 711/4 |
| 6,047,356 A | | 4/2000 | Anderson et al. |
| 2002/0129123 A1 | | 9/2002 | Johnson et al. |
| 2004/0168026 A1 | | 8/2004 | Wu et al. |
| 2004/0205387 A1 | | 10/2004 | Kleiman et al. |

FOREIGN PATENT DOCUMENTS

EP 0 955 574 A2 11/1999

OTHER PUBLICATIONS

"Information technology—SCSI-3 Steam Commands (SSC)" [Online], Jan. 2000, p. I-X, 1-94, XP002405750, Retrieved from the Internet: URL: http://www.t10.org/ftp/t10/drafts/ssc/ssc-r22.pdf [retrieved on Oct. 23, 2006], p. 32-p. 34.
Mark Dalrymple: "STUC on You" [Online], Jan. 8, 2005, pp. 1-9, XP00240571, Retrieved from the Internet: URL: http://web.archive.org/web/20050207105 642/http://borkware.com/rants/stuc-on-you/, [retrieved on Oct. 23, 2006], p. 7, line 5-line 22.

* cited by examiner

*Primary Examiner*—Kimberly McLean
(74) *Attorney, Agent, or Firm*—Cardinal Law Group

(57) ABSTRACT

A read request of a sequential media from a host is executed with a read request data block size equal to a maximum recorded data block size parameter of the variable data block size storage device. Subsequently, if warranted, an adaptive read ahead data block size variable is set to equal a recorded data block size of data recorded on the sequential media that is responsive to the execution of the read request, and one or more read ahead requests of the sequential media are executed with a read ahead data block size equal to the adaptive read ahead data block size variable. The adaptive read ahead data block size variable is conditionally adjusted based on the recorded data block size(s) of data recorded on the sequential media that is responsive to the execution(s) of the read ahead request(s).

21 Claims, 15 Drawing Sheets

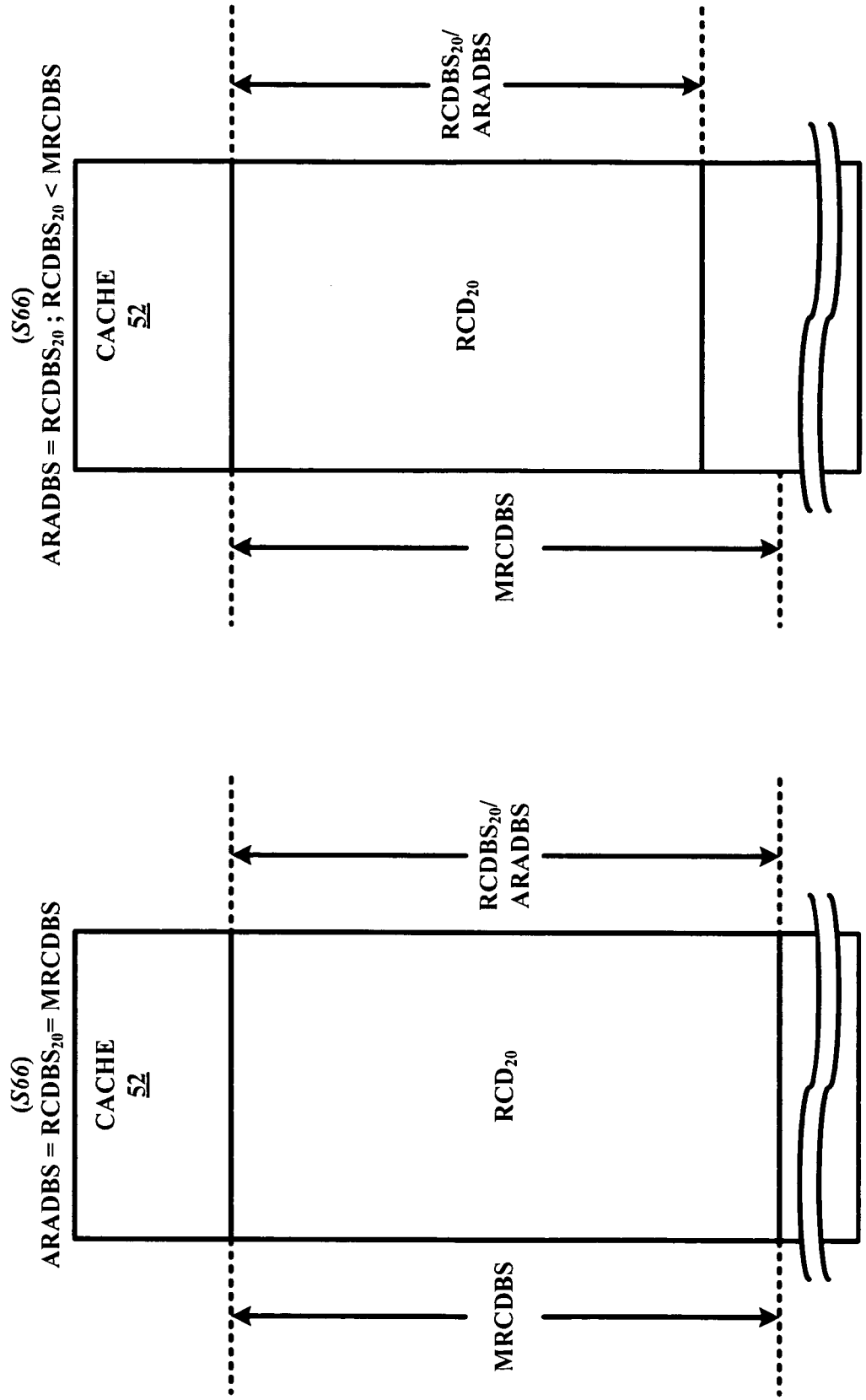

ADAPTIVE READ AHEAD METHOD OF DATA RECORDED ON A SEQUENTIAL MEDIA READABLE VIA A VARIABLE DATA BLOCK SIZE STORAGE DEVICE

FIELD OF INVENTION

The present invention generally relates to executing a read ahead request of data recorded on a sequential media (e.g., tape) readable via a variable data block size storage device (e.g., a tape drive). The present invention specifically relates to executing the read ahead request based on a dynamic prediction of the recorded data block size of recorded data of the sequential media that is responsive to the execution of the read ahead request.

BACKGROUND OF THE INVENTION

FIG. 1 illustrates a conventional storage subsystem employing a host 20, a variable data block size storage device 30 (e.g., a tape drive system), and a storage controller 40 employing a sequential media read module 41 for executing read requests of data recorded on a sequential media 31 (e.g., a tape cartridge) readable by way of a device 30 as requested by host 20 and for autonomously executing read ahead requests of the data recorded on sequential media 31 on behalf of host 20.

In operation, module 41 initially executes a read request $RR_{20}$ of the data recorded on sequential media 31 as requested by host 20 and returns recorded data $RCD_{20}$ responsive to the execution of read request $RR_{20}$ to host 20. Thereafter, module 41 determines if the execution of one or more read ahead requests of the data recorded on sequential media 31 on behalf of host 20 is warranted. If so, as exemplarily illustrated in FIGS. 2 and 3, module 41 conservatively allocates space in a cache 42 for one or more read requests where a read ahead data block size ("RADBS") of each read ahead request equals a maximum recorded data block size ("MRCDBS") parameter of device 30. This allocation of space by module 41 is necessary in view of the facts that the recorded data block size of some or all of the data recorded on sequential media 31 may be less than the MRCDBS parameter, and module 41 will not know the largest recorded data block size of the data recorded on sequential media 31 when executing a read ahead request. Module 41 therefore executes an X number of read ahead requests $RAR_{42(X)}$ with the read ahead data block size RADBS of each read ahead request equaling the MRCDBS parameter. This conservative read ahead process is optimally performed by module 41 when the recorded data block size $RCDBS_{42(X)}$ of recorded data $RCD_{42(X)}$ responsive to an execution of a read ahead request $RAR_{42(X)}$ as stored in cache 42 equals the read ahead data block size $RADBS_{42(X)}$ of the read ahead request $RAR_{42(X)}$ as exemplarily shown in FIG. 2. Conversely, this conservative read ahead process is not optimally performed by module 41 when the recorded data block size $RCDBS_{42(X)}$ of recorded data $RCD_{42(X)}$ responsive to an execution of a read ahead request $RAR_{42(X)}$ as stored in cache 42 is less than the read ahead data block size $RADBS_{42(X)}$ of the read ahead request $RAR_{42(X)}$ as exemplarily shown in FIG. 3. The primary reason such a case is not optimal is the requirement by device 30 to execute an interrupt to build a special status and extra interface overhead to report to module 41 the difference between the recorded data block size $RCDBS_{42(X)}$ of recorded data $RCD_{42(X)}$ as stored in device 31 and the read ahead data block size $RADBS_{42(X)}$ of the read ahead request $RAR_{42(X)}$.

A challenge therefore for the storage industry is to improve upon a performance of a read ahead processing of data recorded on a sequential media readable via a variable data block size storage device when the recorded data block size of recorded data responsive to a read ahead request does not equal the read ahead data block size of the read ahead request.

SUMMARY OF THE INVENTION

One form of the present invention is signal bearing medium tangibly embodying a program of machine-readable instructions executable by a processor to implement an adaptive read ahead of a sequential media readable via a variable data block size sequential storage device. The operations comprising an execution of a read request of the sequential media in response to an electrical communication of the read request from a host, wherein the read request is executed with a read request data block size equal to a maximum recorded data block size parameter of the variable data block size storage device, and subsequent to the execution of the read request of the sequential media, a setting of an adaptive read ahead data block size variable to equal a recorded data block size of data recorded on the sequential media that is responsive to the execution of the read request.

A second form of the present invention is a system comprising a processor and a memory storing instructions operable with the processor for implementing an adaptive read ahead of a sequential media readable via a variable data block size sequential storage device. The instructions are executed for executing a read request of the sequential media in response to an electrical communication of the read request from a host, wherein the read request is executed with a read request data block size equal to a maximum recorded data block size parameter of the variable data block size storage device, and subsequent to the execution of the read request of the sequential media, setting an adaptive read ahead data block size variable to equal a recorded data block size of data recorded on the sequential media that is responsive to the execution of the read request.

A third form of the present invention is method for implementing an adaptive read ahead of a sequential media readable via a variable data block size sequential storage device. The method comprising an execution of a read request of the sequential media in response to an electrical communication of the read request from a host, wherein the read request is executed with a read request data block size equal to a maximum recorded data block size parameter of the variable data block size storage device, and subsequent to the execution of the read request of the sequential media, a setting of an adaptive read ahead data block size variable to equal a recorded data block size of data recorded on the sequential media that is responsive to the execution of the read request.

The forgoing forms and other forms, objects, and aspects as well as features and advantages of the present invention will become further apparent from the following detailed description of the various embodiments of the present invention, read in conjunction with the accompanying drawings. The detailed description and drawings are merely illustrative of the present invention, rather than limiting the scope of the present invention being defined by the appended claims and equivalents thereof.

BRIEF DESCRIPTION OF THE DRAWINGS

FIGS. 6 and 7 illustrate exemplary executions of a read request by the storage subsystem illustrated in FIG. 4 in accordance with the flowchart illustrated in FIG. 5;

DETAILED DESCRIPTION OF THE PRESENT INVENTION

Figure 4:
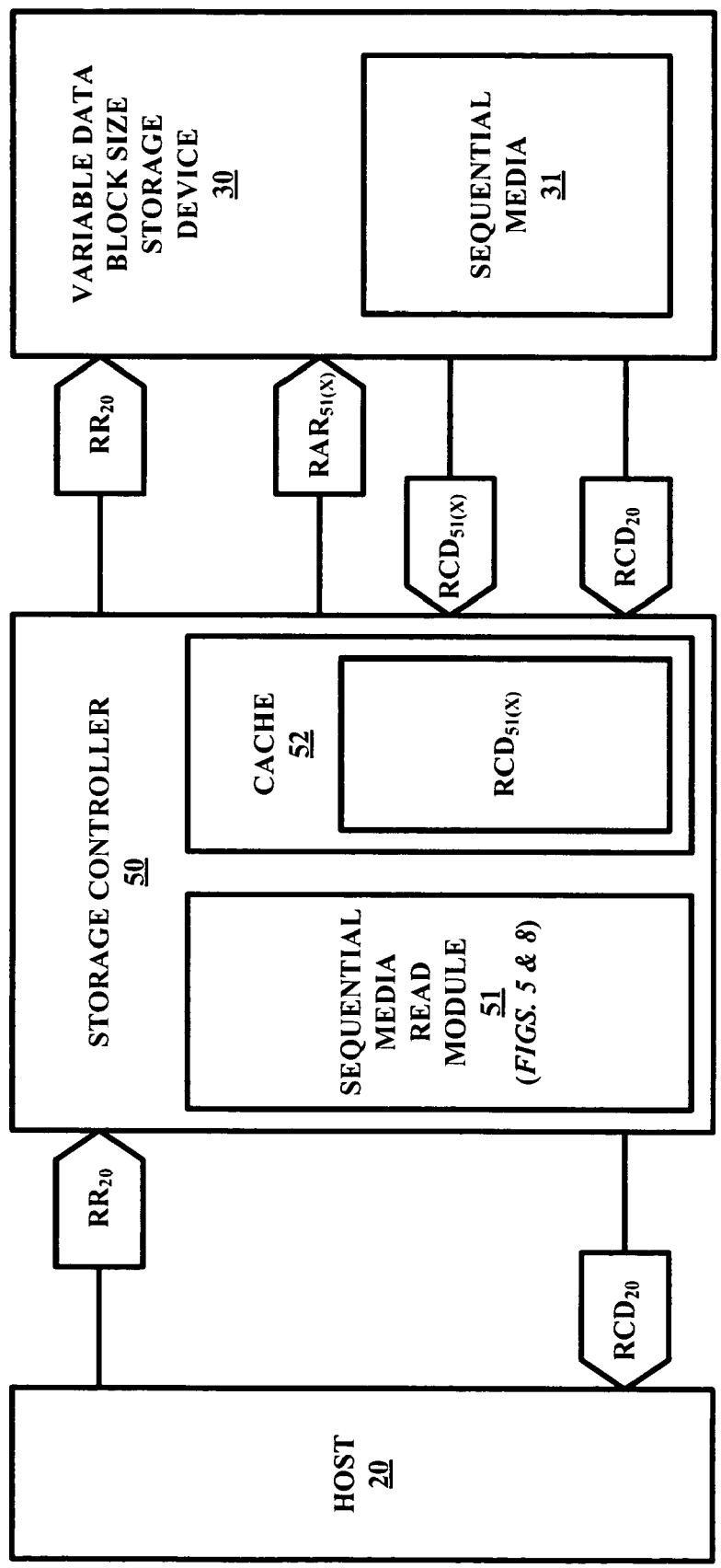
FIG. 4 illustrates one embodiment of a storage subsystem in accordance with the present invention.

FIG. 4 illustrates a storage subsystem of the present invention employing host 20, variable block size storage device 30 (e.g., a tape drive), and a storage controller 50 employing a sequential media read module 51 for conventionally executing read requests of data recorded on a sequential media 31 (e.g., a tape cartridge) mounted on device 30 as requested by host 20 and for autonomously executing read ahead requests of the data recorded on sequential media 31 on behalf of host 20 in accordance with the present invention. To this end, storage controller 50 is structurally configured with hardware, software and/or firmware to implement a read request execution method and a read ahead request execution method of the present invention. The following description of exemplary embodiments of the read request execution method and a read ahead request execution method of the present invention does not limit the scope of the read request execution method and a read ahead request execution method of the present invention.

Figure 5:
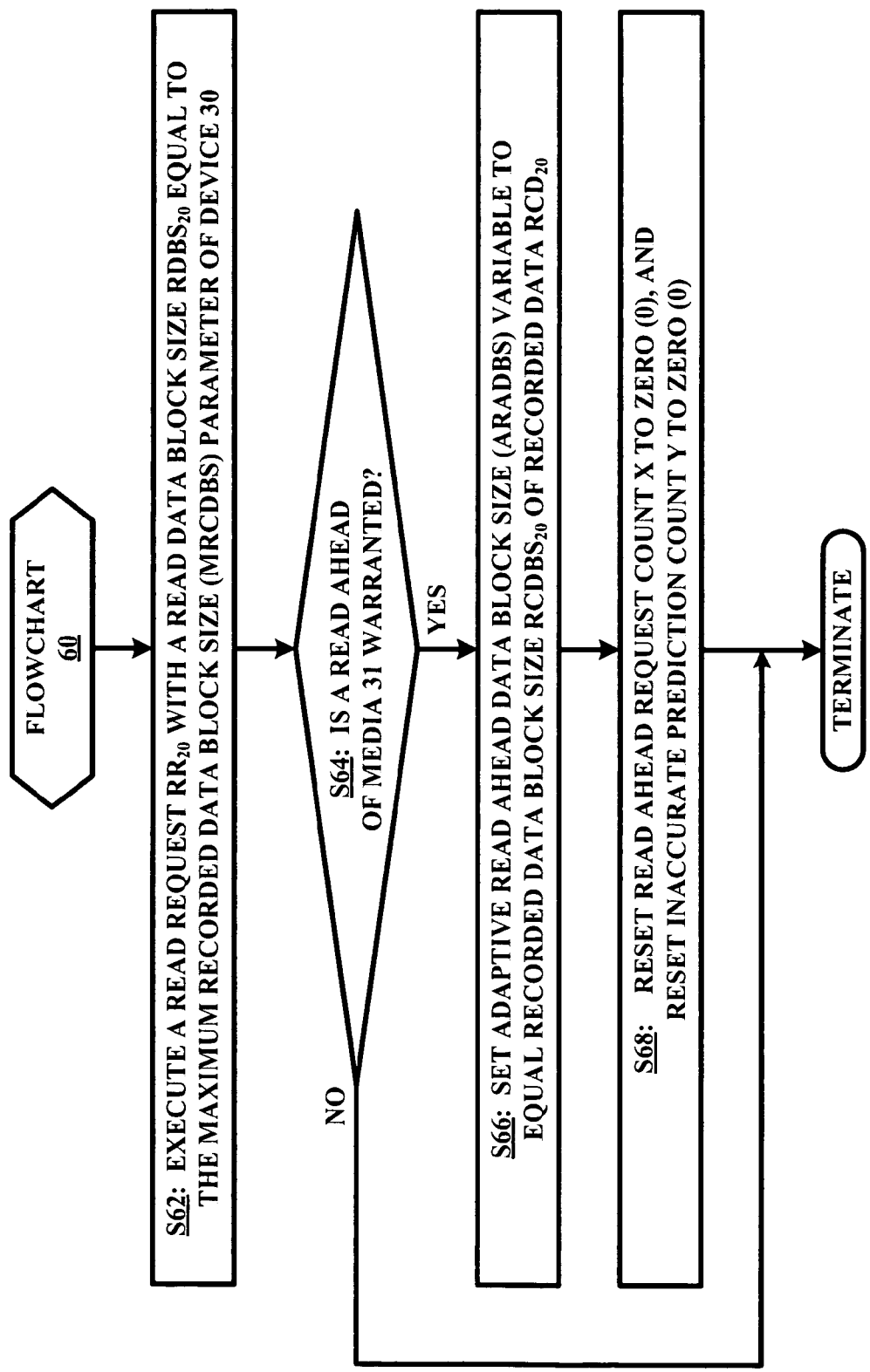
FIG. 5 illustrates a flowchart representative of one embodiment of a read request execution method in accordance with the present invention.

FIG. 5 illustrates a flowchart 60 representative of one exemplary embodiment of the read request execution method of the present invention. Referring to FIG. 5, a stage S62 of flowchart 50 encompasses module 51 executing a read request $RR_{20}$ of the data recorded on sequential media 31 with a read data block size $RDBS_{20}$ equal to a maximum recorded data block size ("MRCDBS") parameter of device 30. In one embodiment of stage S62, module 51 queries device 30 for the MRCDBS parameter, receives an electrical communication of read request $RR_{20}$ from host 20, formats read request $RR_{20}$ with the read data block size $RDBS_{20}$ equal to the maximum recorded data block size ("MRCDBS") parameter, electrically communicates the formatted read request $RR_{20}$ to device 30, receives an electrical communication of data $RCD_{20}$ recorded on sequential media 31 that is responsive to read request $RR_{20}$, and returns the recorded data $RCD_{20}$ to host 20.

A stage S64 of flowchart 60 encompasses module 51 determining whether a read ahead of sequential media 31 is warranted. In one embodiment of stage S64, module 51 implements a read ahead policy in determining whether a read ahead of sequential media 31 is warranted. If a read ahead of sequential media 31 is not warranted, then module 51 proceeds to terminate flowchart 60. Otherwise, module 51 sequentially proceeds to a stage S66 of flowchart 60 to set an adaptive read ahead data block size ("ARADBS") variable to equal a recorded data block size $RCDBS_{20}$ of the recorded data $RCD_{20}$, which may equal the MRCDBS parameter as illustrated in FIG. 6 or which may be less the MRCDBS parameter as illustrated in FIG. 7, and to a stage S68 of flowchart 60 to reset a read ahead request count X and an inaccurate prediction count Y to zero (0). Thereafter, module 51 terminates flowchart 60 to thereby implement a flowchart 70 illustrated in FIG. 8 that is representative of the read ahead execution method of the present invention.

As will be further explained in connection with the description of flowchart 70, the ARADBS variable is conditionally adjusted during the execution of read ahead requests by module 51 based on a comparison of the recorded data block sizes of data recorded on sequential media 31 that are responsive to the executions of the read ahead requests to the ARADBS variable, and on a comparison of the optional inaccurate prediction count Y and an inaccurate prediction threshold. To facilitate understanding of the read ahead execution method of the present invention, flowchart 70 will be explained herein in the context of an initial execution of stages S72-S76 of flowchart 70.

Figure 8:
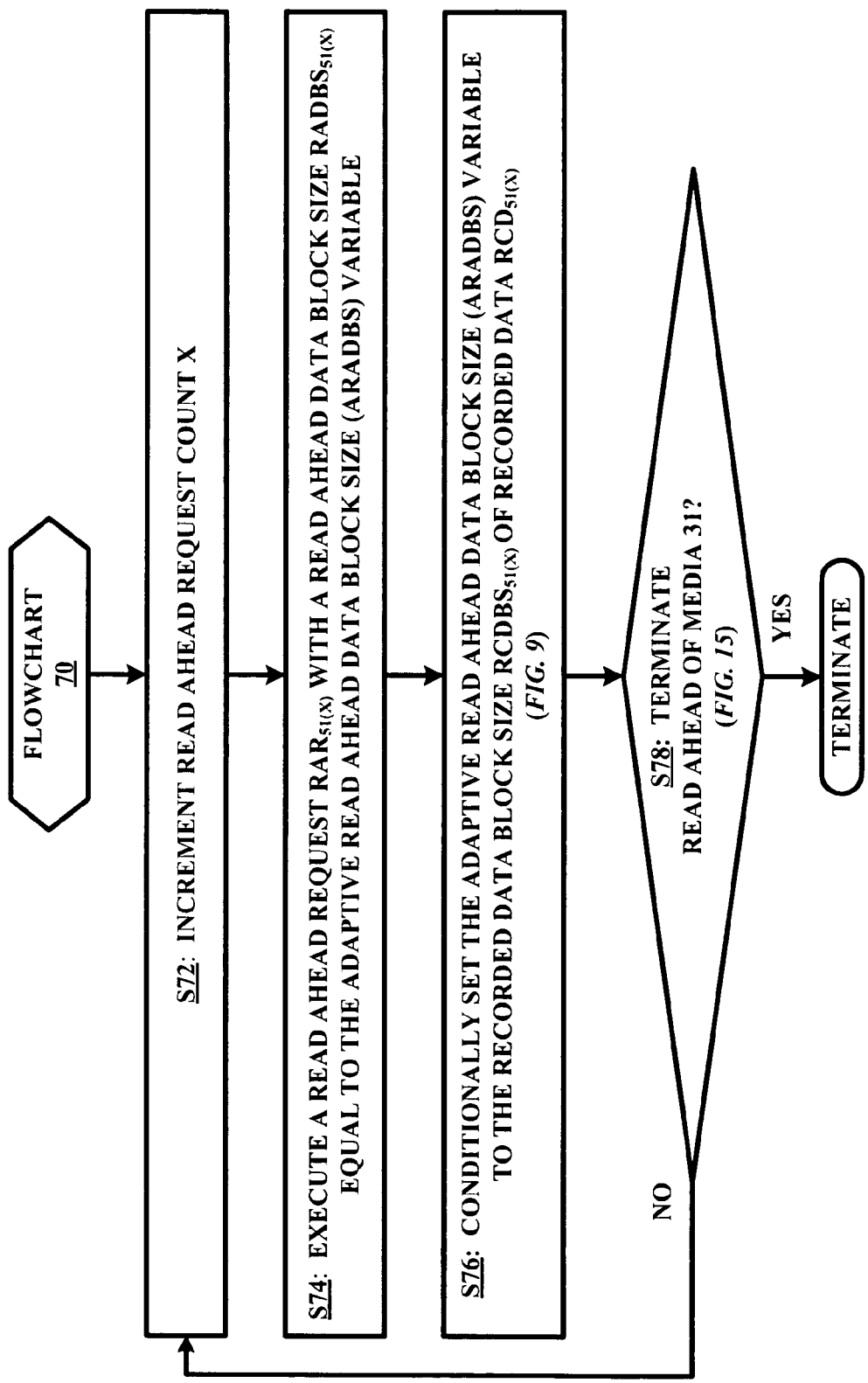
FIG. 8 illustrates a flowchart representative of one embodiment of a read ahead execution request method in accordance with the present invention.

Referring to FIG. 8, a stage S72 of flowchart 70 encompasses module 51 incrementing read ahead request count X from zero (0) to one (1). A stage S74 of flowchart 70 encompasses module 51 executing a read ahead request $RAR_{51(1)}$ with a read ahead data block size $RADBS_{51(1)}$ equal to the ARADBS variable, which at this time is equal to the recorded data block size $RCDBS_{20}$ of the recorded data $RCD_{20}$. A stage S76 of flowchart 70 encompasses module 51 conditionally setting the ARADBS variable equal to a recorded data block size $RCDBS_{51(1)}$ of data $RCD_{51(1)}$ recorded on sequential media 31 that is responsive to the execution of read ahead request $RAR_{51(1)}$.

The present invention does not impose any limitations or any restrictions as to the structurally configuration of module 51 in performing stages S72-S76. Thus, the following description of an exemplary embodiment of stage S76 as represented by a flowchart 80 illustrated in FIG. 9 does not limit or restrict the scope of the structural configurations of module 51 in accordance with the present invention.

Figure 9:
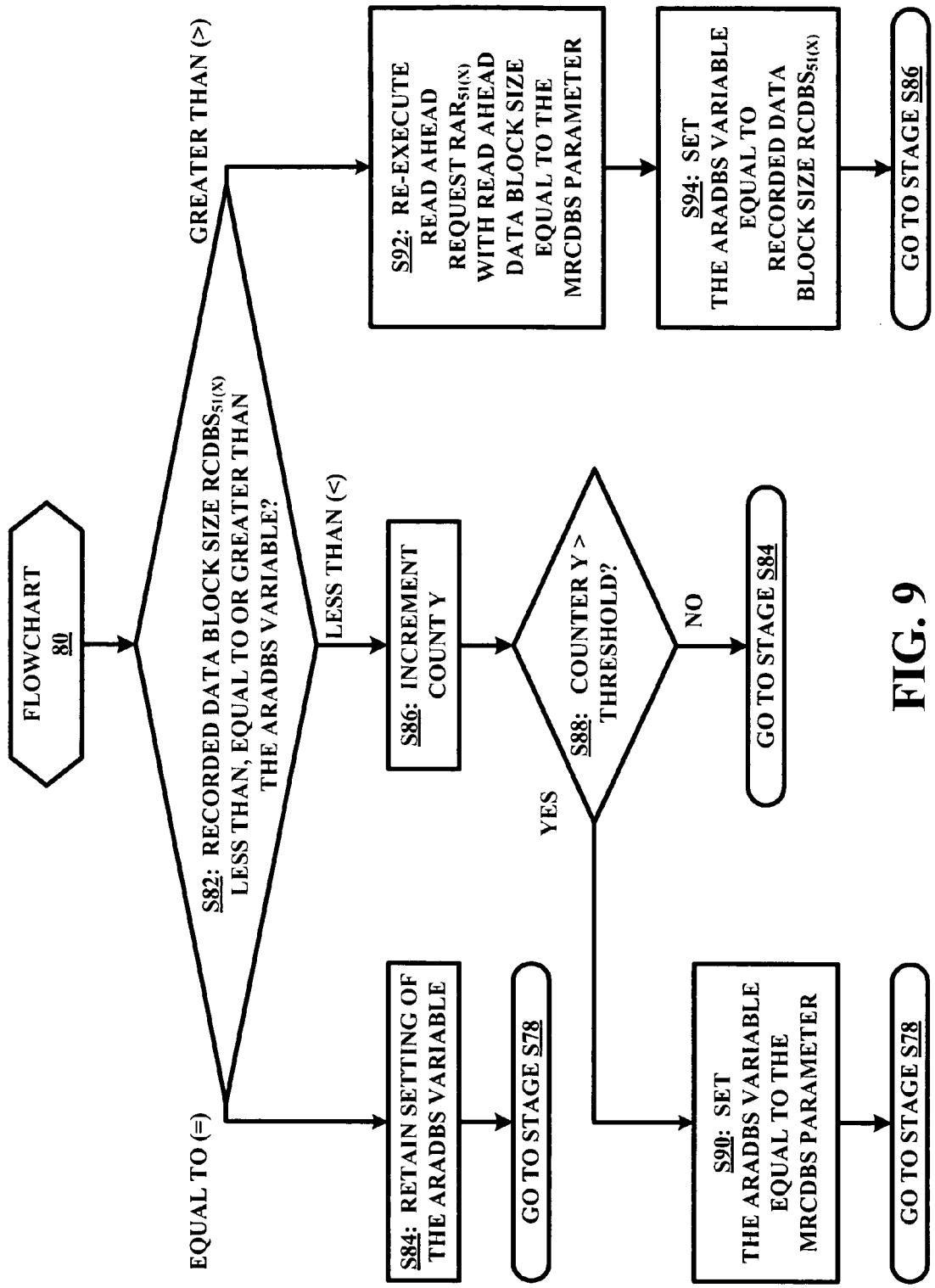
FIG. 9 illustrates a flowchart representative of one embodiment of a read ahead data block size adaptation method in accordance with the present invention.
Figure 10:
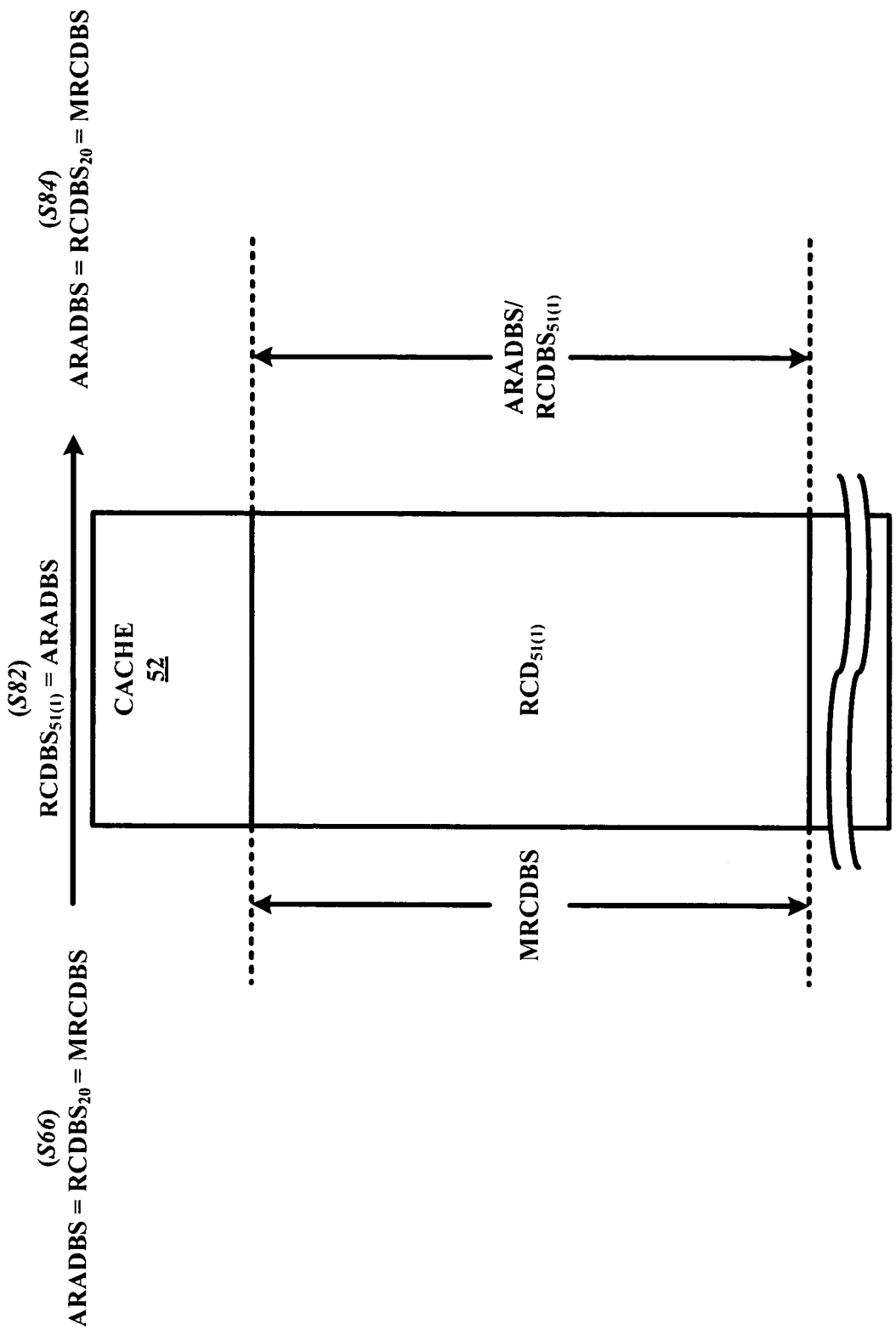
FIGS. 10-15 illustrates exemplary executions of read ahead requests by the storage subsystem illustrated in FIG. 4 in accordance with the flowcharts illustrated in FIGS. 8 and 9.
Figure 11:
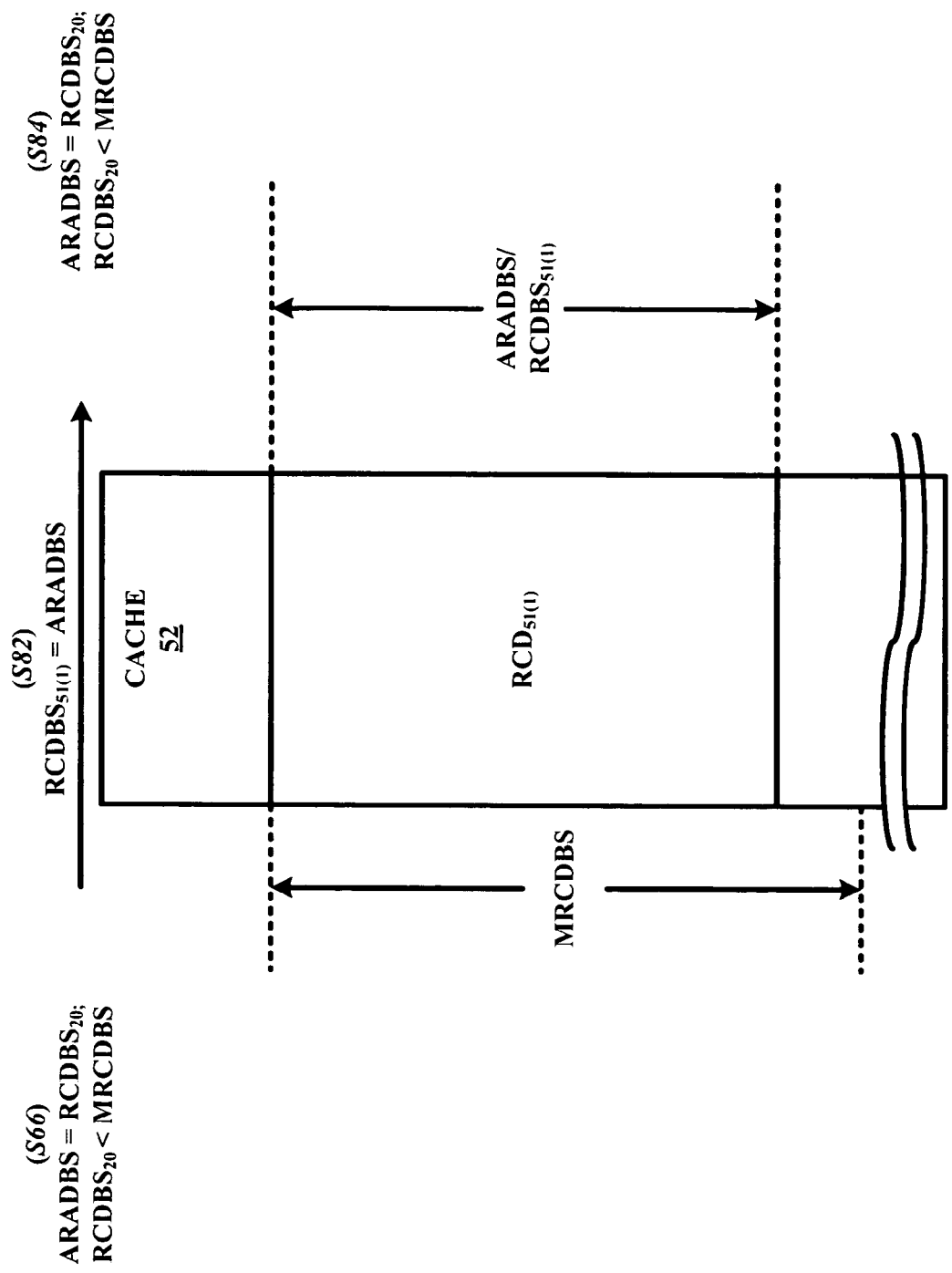

Referring to FIG. 9, a stage S82 of flowchart 80 encompasses module 51 determining whether recorded data block size $RCDBS_{51(1)}$ of recorded data $RCD_{51(1)}$ is less than (<), equal to (=) or greater than (>) the ARADBS variable, which at this time is equal to the recorded data block size $RCDBS_{20}$ of the recorded data $RCD_{20}$. If module 51 determines during stage S82 that recorded data block size $RCDBS_{51(1)}$ of recorded data $RCD_{51(1)}$ is equal to (=) the ARADBS variable, then module 51 proceeds to a stage S84 of flowchart 80 to retain the setting of ARADBS variable as being equal to the recorded data block size $RCDBS_{20}$ of the recorded data $RCD_{20}$, which may equal the MRCDBS parameter as illustrated in FIG. 10 or which may be less the MRCDBS parameter as illustrated in FIG. 11. Thereafter, module 51 proceeds to stage S72 to thereby execute stages S74 and S76 with read ahead request count X incremented from one (1) to two (2).

Figure 12:
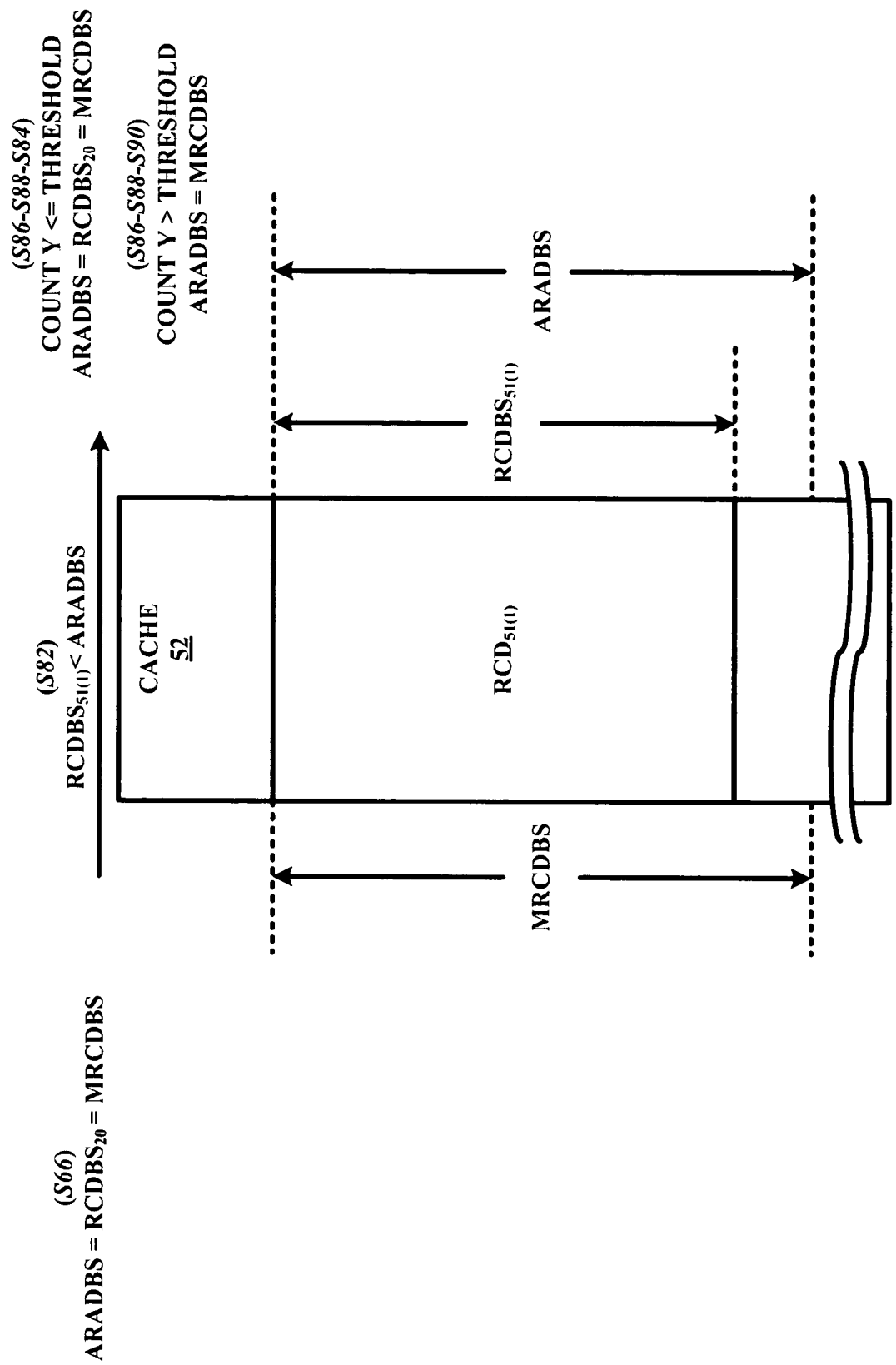
Figure 13:
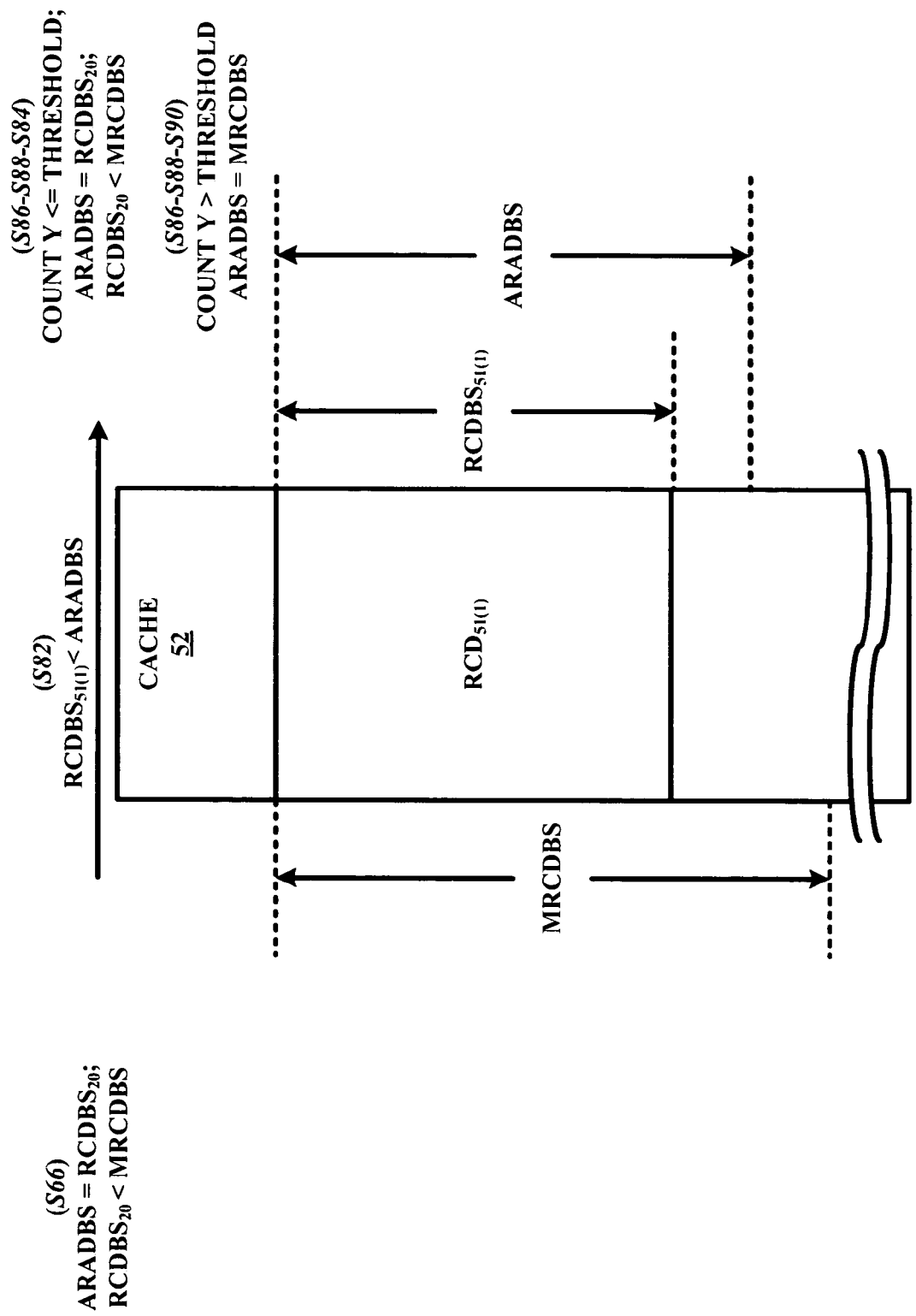

If module 51 determines during stage S82 that recorded data block size $RCDBS_{51(1)}$ of recorded data $RCD_{51(1)}$ is less than (<) the ARADBS variable, then module 51 sequentially proceed to a stage S86 of flowchart 80 to increment inaccurate prediction count Y from zero (0) to one (1) and a stage S88 of flowchart 80 to determine whether the incremented inaccurate prediction count Y exceeds the inaccurate predication threshold. If module 51 decides during stage S88 that the incremented inaccurate prediction count Y does not exceed the inaccurate predication threshold, the module 51 proceeds to stage S84 to retain the setting of ARADBS variable as being equal to the recorded data block size $RCDBS_{20}$ of the recorded data $RCD_{20}$, which may equal the MRCDBS parameter as illustrated in FIG. 12 or which may be less the MRCDBS parameter as illustrated in FIG. 13. Otherwise, module 51 proceeds to a stage S90 of flowchart 80 to set the ARADBS variable equal to the MRCDBS parameter as exemplarily illustrated in FIGS. 12 and 13.

Figure 14:
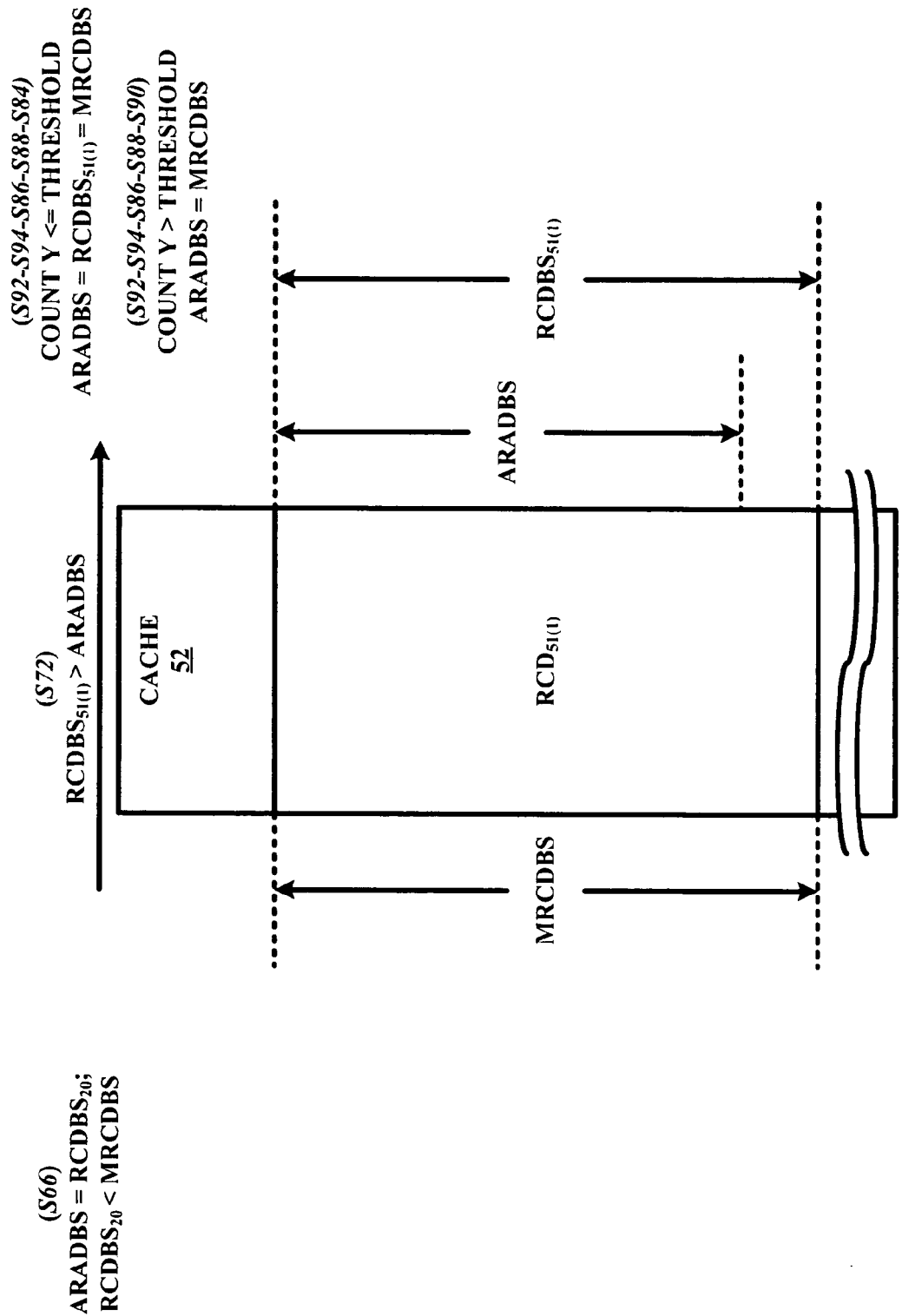
Figure 15:
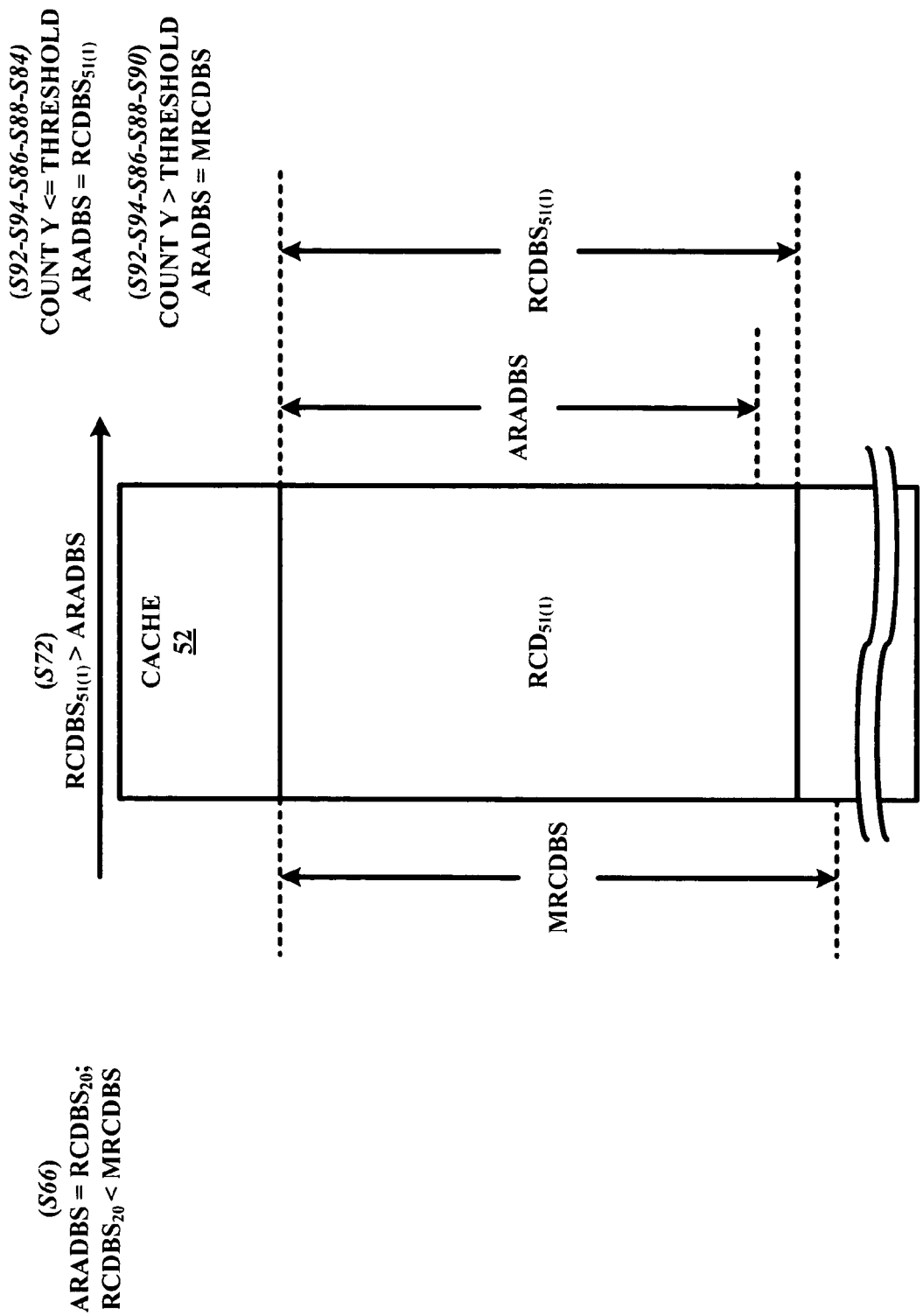

If module 51 determines during stage S82 that recorded data block size $RCDBS_{51(1)}$ of recorded data $RCD_{51(1)}$ is greater than (<) the ARADBS variable (which can only be the case if the ARADBS variable is less than the MRCDBS parameter), then module 51 sequentially proceeds to a stage S92 to re-execute read ahead request $RAR_{51(1)}$ with the read ahead data block size $RADBS_{51(1)}$ equal to the MRCDBS parameter, a stage S94 of flowchart 80 to set the ARABS variable equal to the recorded data block size $RCDBS_{51(1)}$ of recorded data $RCD_{51(1)}$, which is responsive to the re-execution of read ahead request $RAR_{51(1)}$, and to stage S86 to increment the inaccurate prediction count Y. Thereafter, if module 51 decides during stage S88 that the incremented inaccurate prediction count Y does not exceed the inaccurate predication threshold, the module 51 proceeds to stage S84 to retain the setting of ARADBS variable as being equal to the recorded data block size $RCDBS_{51(1)}$ of recorded data $RCD_{51(1)}$, which may equal the MRCDBS parameter as illustrated in FIG. 14 or which may be less the MRCDBS parameter as illustrated in FIG. 15. Otherwise, module 51 proceeds to a stage S90 of flowchart 80 to set the ARADBS variable equal to the MRCDBS parameter as exemplarily illustrated in FIGS. 14 and 15.

Referring to FIGS. 8 and 9, irrespective of the determination of stage S82, module 51 will eventually proceed to stage 78 to decide whether flowchart 70 should be terminated. If module 51 decides during stage S78 to continue the read ahead of media 31, then module 51 re-executes the loop S74-S78 with the increment read ahead request count X being incremented from one (1) to two (2) and the ARADBS variable being equal to either the recorded data block size $RCDBS_{20}$ of recorded data $RCD_{20}$, the recorded data block size $RCDBS_{51(1)}$ of recorded data $RCD_{51(1)}$ or the MRCDBS parameter in dependence upon the execution of flowchart 80 with read ahead request count X being equal to one (1).

The present invention does not impose any limitations or any restrictions as to the structurally configuration of module 51 in performing stages S78. Thus, the following description of an exemplary embodiment of stage S78 as represented by a flowchart 100 illustrated in FIG. 16 does not limit or restrict the scope of the structural configurations of module 51 in accordance with the present invention.

Figure 16:
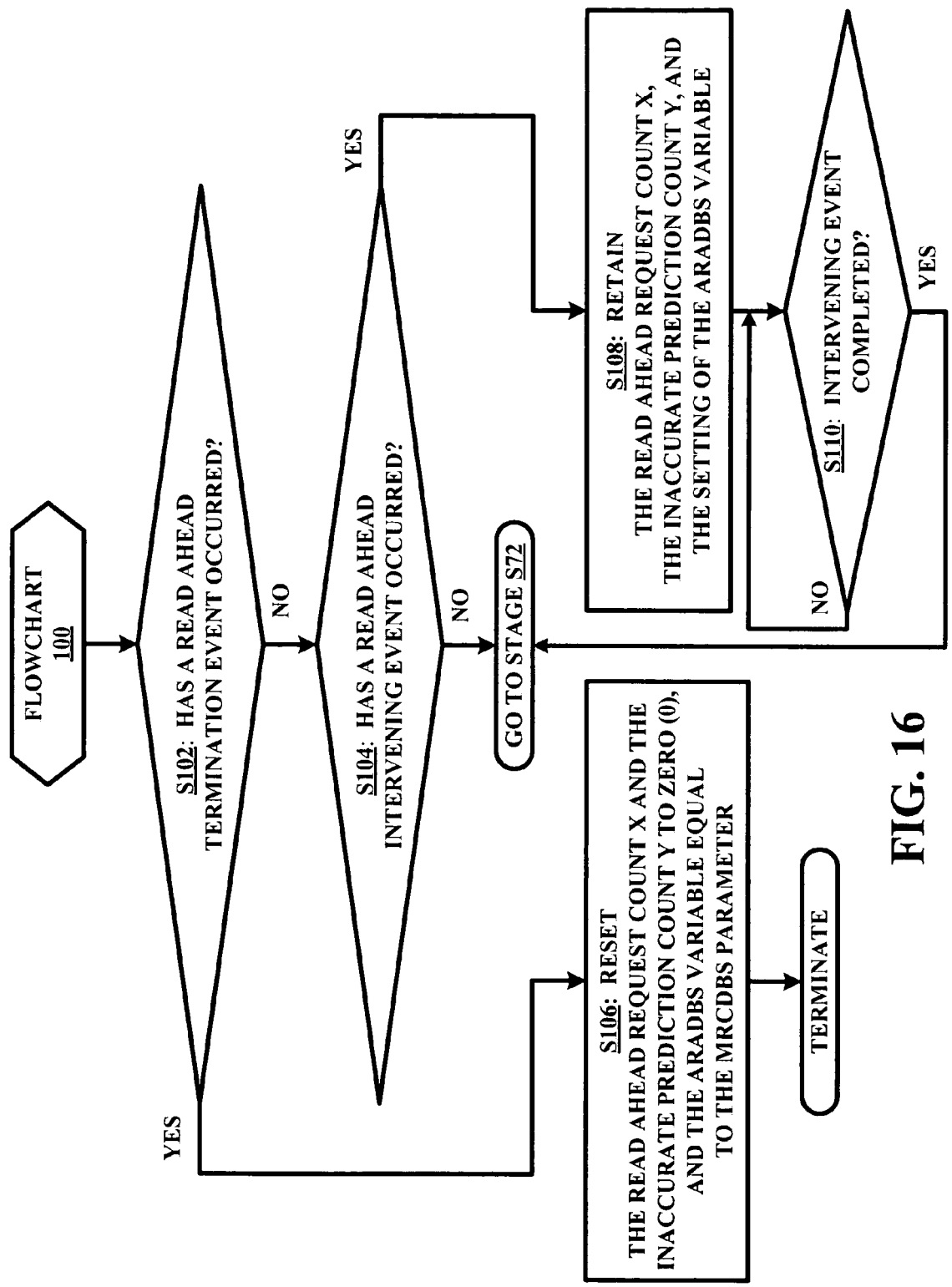
FIG. 16 illustrates a flowchart representative of one embodiment of a read ahead termination method in accordance with the present invention.

Referring to FIG. 16, a stage S102 of flowchart 100 encompasses module 51 determining whether a read ahead termination event has occurred, and a stage S104 of flowchart 100 encompasses module 51 determining whether a read ahead intervening event has occurred. A read ahead termination event for purposes of the present invention is an event that warrants a permanent termination by module 51 of the current read ahead process, such as, for example, module 51 encountering a file mark record during the read ahead process or host 20 issuing a new command that warrants a termination of the read ahead process (e.g., a write type command, or a position command in the form of a locate, space, operation or rewind). A read ahead intervening event for purposes of the present invention is an event that warrants a temporary termination or pause by module 51 of the current read ahead process, such as, for example, a storage capacity of cache 52 is incapable of storing any additional recorded data from media 31.

If module 51 determines during stage S102 that a read ahead termination has not occurred and determines during stage S104 that a read ahead termination has not occurred, then module 51 proceeds to stage S72 as previously described herein in connection with FIGS. 8 and 9.

If module 51 determines during stage S102 that a read ahead termination has occurred, then module 51 proceeds to a stage S106 of flowchart 100 to reset read ahead request count X and inaccurate prediction count Y to zero (0) and to reset the ARADBS variable to equal the MRCDBS parameter. As such, module 51 will start a new read ahead process with a clean slate in view of the fact that the block size of recorded data may have changed since the termination of the previous read ahead process. This is particularly true for cases where host 20 issues a read command after it reads a file mark encountered by module 51 during the previous read ahead process.

If module 51 determines during stage S102 that a read ahead termination has not occurred and determines during stage S104 that a read ahead termination has occurred, then module 51 proceeds to a stage S108 of flowchart 100 to retains read ahead request count X, inaccurate prediction count Y to zero (0) and the setting of the ARADBS variable. Module 51 thereafter proceeds to a stage S110 of flowchart 108 to determine if the intervening event is completed (e.g., a storage capacity of cache 52 is capable of storing additional recorded data from media 31 upon host 20 receiving recorded data from cache 52). Upon completion of the intervening event, module 51 will proceed to stage S72 whereby module 51 will restart the previous read ahead process with the previous setting of the ARADBS variable.

Figure 1:
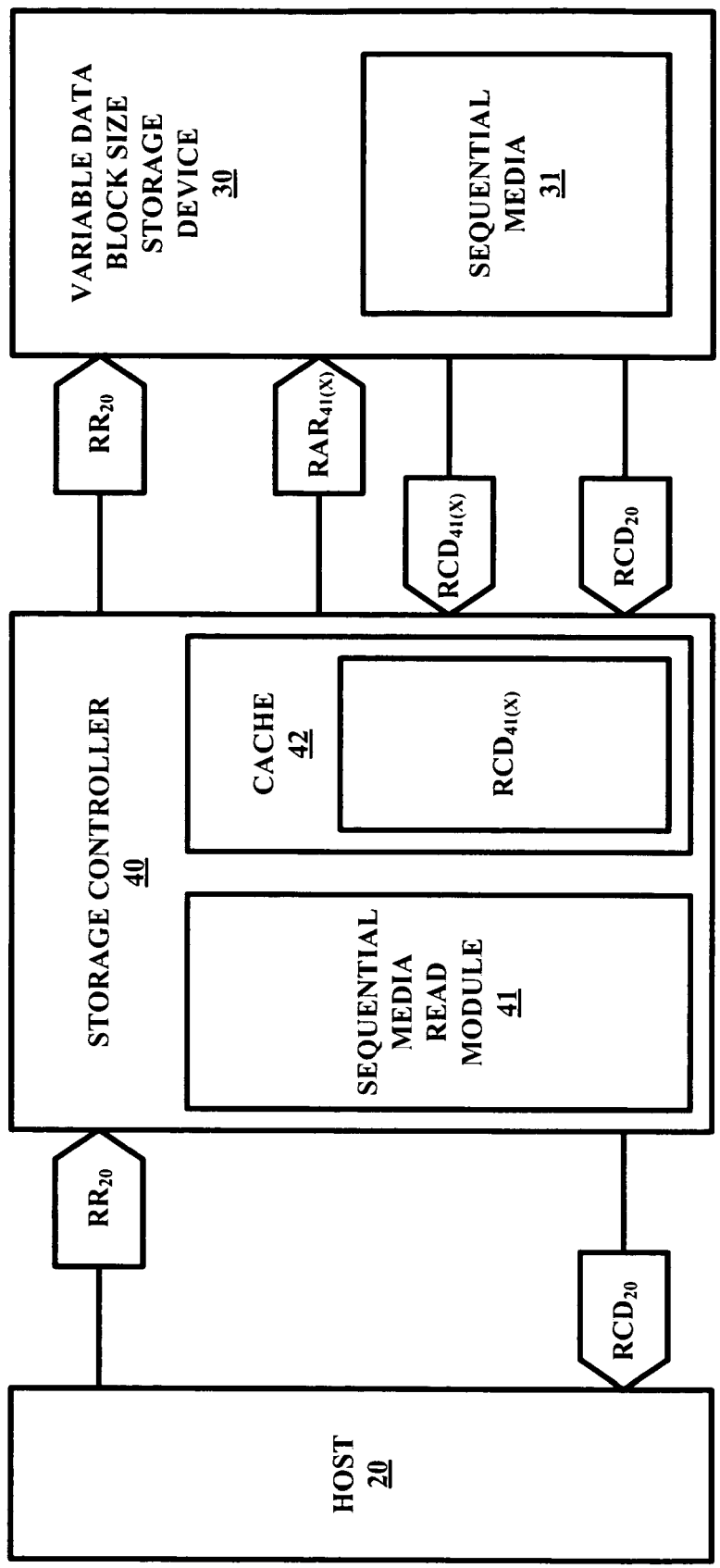
FIG. 1 illustrates a storage subsystem as known in the art.
Figure 3:
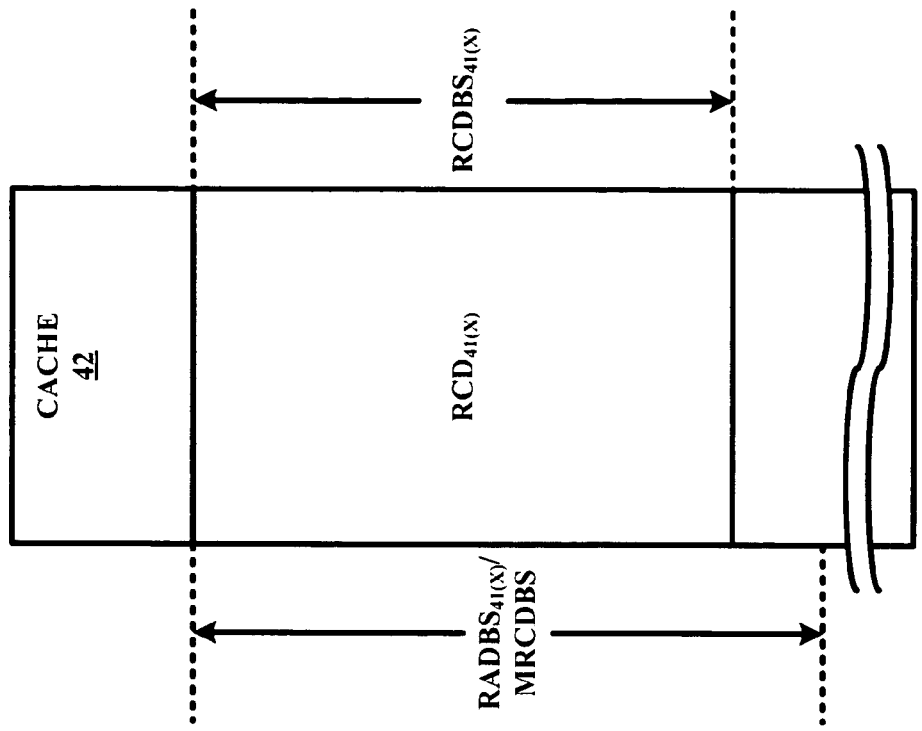
FIGS. 2 and 3 illustrates exemplary executions of a read ahead request by the storage subsystem illustrated in FIG. 1.
Figure 2:
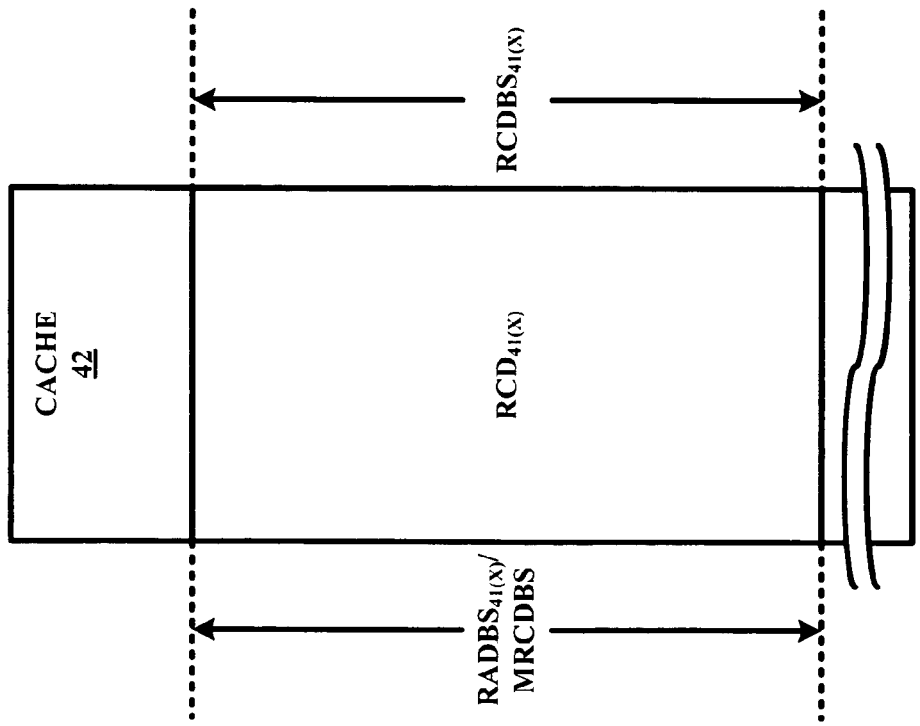

From the preceding description of flowchart 60 (FIG. 5), flowchart 70 (FIG. 8) and flowchart 80 (FIG. 9), those having ordinary skill in the art will appreciate the various advantages of the ARADBS variable and inaccurate prediction count Y of the present invention in improving the performance of a module 51 in executing read ahead requests $RAR_{51(X)}$ of media 31 on behalf of host 20 (FIG. 3) as compared to the performance of module 41 in executing read ahead requests $RAR_{41(X)}$ of media 31 on behalf of host 20 (FIG. 1).

Figure 17:
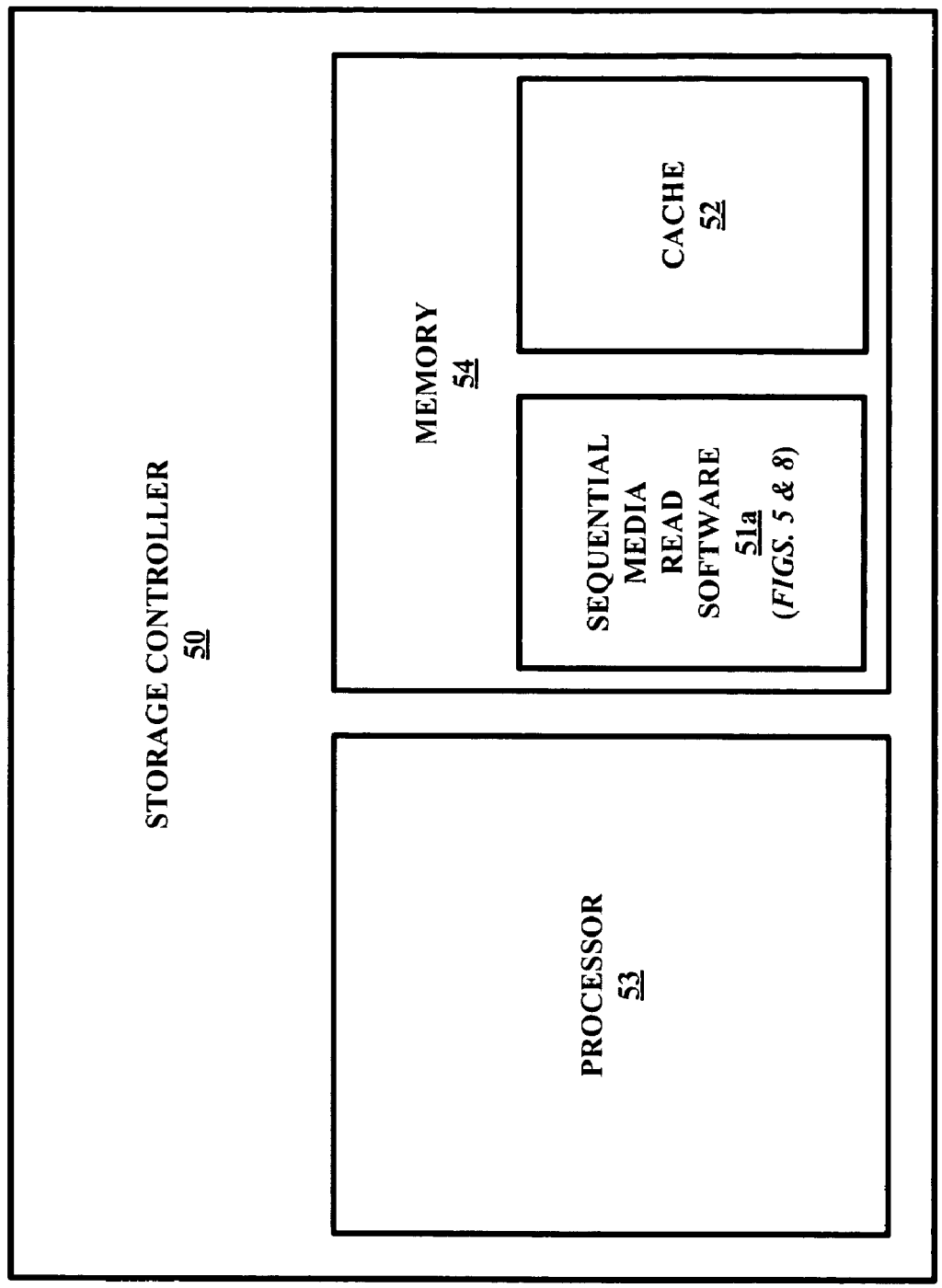
FIG. 17 illustrates one embodiment of a storage controller in accordance with the present invention.

Referring to FIG. 17, in a practical embodiment, sequential mead read module 51 (FIG. 3) is embodied as a software 51a written in a conventional language and installed within a memory 54 of storage controller 50 whereby a processor 53 of storage controller 50 can execute software 51a to perform various operations of the present invention as described in connection with the illustrations of FIGS. 4-16.

While module 51 has been described herein as being employed within controller 50, in practice module 51 can alternatively be implemented as hardware, software and/or firmware in host 20 or device 30.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A signal bearing medium tangibly embodying a program of machine-readable instructions executable by a processor to perform operations to implement an adaptive read ahead method of a sequential media readable via a variable data block size storage device, the operations comprising: executing a read request of the sequential media in response to an electrical communication of the read request from a host, wherein the read request is executed with a read request data block size equal to a maximum recorded data block size parameter of the variable data block size storage device; and subsequent to the execution of the read request of the sequential media, setting an adaptive read ahead data block size variable to equal a recorded data block size of data recorded on the sequential media that is responsive to the execution of the read request; and subsequent to the execution of the read request of the sequential media, executing a read ahead request of the sequential media with a read ahead data block size equal to the adaptive read ahead data block size variable; and subsequent to the execution of the read ahead request of the sequential media, conditionally setting the adaptive read ahead data block size variable to equal a recorded data block size of data recorded on the sequential media that is responsive to the execution of the read ahead request, wherein conditionally setting the adaptive read ahead data block size variable to equal the recorded data block size of data recorded on the sequential media that is responsive to the execution of the read ahead request includes: retaining the setting of the adaptive read ahead data block size variable equal to the recorded data block size of data recorded on the sequential media that is responsive to the execution of the read request in response to determining the recorded data block size of data recorded on the sequential media that is responsive to the execution of the read ahead request is less than the setting of the adaptive read ahead data block size variable.

2. A signal bearing medium tangibly embodying a program of machine-readable instructions executable by a processor to perform operations to implement an adaptive read ahead method of a sequential media readable via a variable data block size storage device, the operations comprising: executing a read request of the sequential media in response to an electrical communication of the read request from a host, wherein the read request is executed with a read request data block size equal to a maximum recorded data block size parameter of the variable data block size storage device; and subsequent to the execution of the read request of the sequential media, setting an adaptive read ahead data block size variable to equal a recorded data block size of data recorded on the sequential media that is responsive to the execution of the read request; and subsequent to the execution of the read request of the sequential media, executing a read ahead request of the sequential media with a read ahead data block size equal to the adaptive read ahead data block size variable; and subsequent to the execution of the read ahead request of the sequential media, conditionally setting the adaptive read ahead data block size variable to equal a recorded data block size of data recorded on the sequential media that is responsive to the execution of the read ahead request, wherein conditionally setting the adaptive read ahead data block size variable to equal the recorded data block size of data recorded on the sequential media that is responsive to the execution of the read ahead request includes: incrementing an inaccurate prediction count in response to determining the recorded data block size of data recorded on the sequential media that is responsive to the execution of the read ahead request is less than the setting of the adaptive read ahead data block size variable equal to the recorded data block size of data recorded on the sequential media that is responsive to the execution of the read request; and retaining the setting of the adaptive read ahead data block size variable in response to the incremented inaccurate prediction count being less than an inaccurate prediction threshold.

3. A signal bearing medium tangibly embodying a program of machine-readable instructions executable by a processor to perform operations to implement an adaptive read ahead method of a sequential media readable via a variable data block size storage device, the operations comprising: executing a read request of the sequential media in response to an electrical communication of the read request from a host, wherein the read request is executed with a read request data block size equal to a maximum recorded data block size parameter of the variable data block size storage device; and subsequent to the execution of the read request of the sequential media, setting an adaptive read ahead data block size variable to equal a recorded data block size of data recorded on the sequential media that is responsive to the execution of the read request; and subsequent to the execution of the read request of the sequential media, executing a read ahead request of the sequential media with a read ahead data block size equal to the adaptive read ahead data block size variable; and subsequent to the execution of the read ahead request of the sequential media, conditionally setting the adaptive read ahead data block size variable to equal a recorded data block size of data recorded on the sequential media that is responsive to the execution of the read ahead request, wherein conditionally setting the adaptive read ahead data block size variable to equal the recorded data block size of data recorded on the sequential media that is responsive to the execution of the read ahead request includes: incrementing an inaccurate prediction count in response to determining the recorded data block size of data recorded on the sequential media that is responsive to the execution of the read ahead request is less than the setting of the adaptive read ahead data block size variable equal to the recorded data block size of data recorded on the sequential media that is responsive to the execution of the read request; and retaining the setting of the adaptive read ahead data block size variable in response to the incremented inaccurate prediction count being equal to an inaccurate prediction threshold.

4. A signal bearing medium tangibly embodying a program of machine-readable instructions executable by a processor to perform operations to implement an adaptive read ahead method of a sequential media readable via a variable data block size storage device, the operations comprising: executing a read request of the sequential media in response to an electrical communication of the read request from a host, wherein the read request is executed with a read request data block size equal to a maximum recorded data block size parameter of the variable data block size storage device; and subsequent to the execution of the read request of the sequential media, setting an adaptive read ahead data block size variable to equal a recorded data block size of data recorded on the sequential media that is responsive to the execution of the read request; and subsequent to the execution of the read request of the sequential media, executing a read ahead request of the sequential media with a read ahead data block size equal to the adaptive read ahead data block size variable; and subsequent to the execution of the read ahead request of the sequential media, conditionally setting the adaptive read ahead data block size variable to equal a recorded data block size of data recorded on the sequential media that is responsive to the execution of the read ahead request, wherein conditionally setting the adaptive read ahead data block size variable to equal the recorded data block size of data recorded on the sequential media that is responsive to the execution of the read ahead request includes: re-executing the read ahead request of the sequential media with a read ahead data block size equal to the maximum recorded data block size parameter of the variable data block size storage device in response to determining the recorded data block size of data recorded on the sequential media that is responsive to the execution of the read ahead request is greater than the setting of the adaptive read ahead data block size variable to equal the recorded data block size of data recorded on the sequential media that is responsive to the execution of the read request.

5. The signal bearing medium of claim 4, wherein conditionally setting the adaptive read ahead data block size variable to equal the recorded data block size of data recorded on the sequential media that is responsive to the execution of the read ahead request further includes: subsequent to the re-execution of the read request of the sequential media, setting the adaptive read ahead data block size variable to equal the recorded data block size of data recorded on the sequential media that is responsive to the re-execution of the read ahead request.

6. The signal bearing medium of claim 5, wherein conditionally setting the adaptive read ahead data block size variable to equal the recorded data block size of data recorded on the sequential media that is responsive to the execution of the read ahead request further includes: incrementing an inaccurate prediction count subsequent to the setting of the adaptive read ahead data block size variable to equal the recorded data block size of data recorded on the sequential media that is responsive to the re-execution of the read ahead request; and retaining the setting of the adaptive read ahead data block size variable response to the incremented inaccurate prediction count being less than an inaccurate prediction threshold.

7. The signal bearing medium of claim 5, wherein conditionally setting the adaptive read ahead data block size variable to equal the recorded data block size of data recorded on the sequential media that is responsive to the execution of the read ahead request further includes: incrementing an inaccurate prediction count subsequent to the setting of the adaptive read ahead data block size variable to equal the recorded data block size of data recorded on the sequential media that is responsive to the re-execution of the read ahead request; and setting the adaptive read ahead data block size variable to equal the maximum recorded data block size of the variable data block size storage device in response to the incremented inaccurate prediction count being greater than an inaccurate prediction threshold.

8. A system, comprising: a processor; and a memory storing instructions operable with the processor for implementing an adaptive read ahead of a sequential media readable via a variable data block size sequential storage device, the instructions are executed for executing a read request of the sequential media in response to an electrical communication of the read request from a host, wherein the read request is executed with a read request data block size equal to a maximum recorded data block size parameter of the variable data block size storage device; and subsequent to the execution of the read request of the sequential media, setting an adaptive read ahead data block size variable to equal a recorded data block size of data recorded on the sequential media that is responsive to the execution of the read request, wherein conditionally setting the adaptive read ahead data block size variable to equal the recorded data block size of data recorded on the sequential media that is responsive to the execution of the read ahead request includes: retaining the setting of the adaptive read ahead data block size variable equal to the recorded data block size of data recorded on the sequential media that is responsive to the execution of the read request in response to determining the recorded data block size of data recorded on the sequential media that is responsive to the execution of the read ahead request is less than the setting of the adaptive read ahead data block size variable.

9. A system, comprising: a processor; and a memory storing instructions operable with the processor for implementing an adaptive read ahead of a sequential media readable via a variable data block size sequential storage device, the instructions are executed for executing a read request of the sequential media in response to an electrical communication of the read request from a host, wherein the read request is executed with a read request data block size equal to a maximum recorded data block size parameter of the variable data block size storage device; and subsequent to the execution of the read request of the sequential media, setting an adaptive read ahead data block size variable to equal a recorded data block size of data recorded on the sequential media that is responsive to the execution of the read request, wherein conditionally setting the adaptive read ahead data block size variable to equal the recorded data block size of data recorded on the sequential media that is responsive to the execution of the read ahead request includes: incrementing an inaccurate prediction count in response to determining the recorded data block size of data recorded on the sequential media that is responsive to the execution of the read ahead request is less than the setting of the adaptive read ahead data block size variable equal to the recorded data block size of data recorded on the sequential media that is responsive to the execution of the read request; and retaining the setting of the adaptive read ahead data block size variable in response to the incremented inaccurate prediction count being less than an inaccurate prediction threshold.

10. A system, comprising: a processor; and a memory storing instructions operable with the processor for implementing an adaptive read ahead of a sequential media readable via a variable data block size sequential storage device, the instructions are executed for executing a read request of the sequential media in response to an electrical communication of the read request from a host, wherein the read request is executed with a read request data block size equal to a maximum recorded data block size parameter of the variable data block size storage device; and subsequent to the execution of the read request of the sequential media, setting an adaptive read ahead data block size variable to equal a recorded data block size of data recorded on the sequential media that is responsive to the execution of the read request, wherein conditionally setting the adaptive read ahead data block size variable to equal the recorded data block size of data recorded on the sequential media that is responsive to the execution of the read ahead request includes: incrementing an inaccurate prediction count in response to determining the recorded data block size of data recorded on the sequential media that is responsive to the execution of the read ahead request is less than the setting of the adaptive read ahead data block size variable equal to the recorded data block size of data recorded on the sequential media that is responsive to the execution of the read request; and retaining the setting of the adaptive read ahead data block size variable in response to the incremented inaccurate prediction count being equal to an inaccurate prediction threshold.

11. A system, comprising: a processor; and a memory storing instructions operable with the processor for implementing an adaptive read ahead of a sequential media readable via a variable data block size sequential storage device, the instructions are executed for executing a read request of the sequential media in response to an electrical communication of the read request from a host, wherein the read request is executed with a read request data block size equal to a maximum recorded data block size parameter of the variable data block size storage device; and subsequent to the execution of the read request of the sequential media, setting an adaptive read ahead data block size variable to equal a recorded data block size of data recorded on the sequential media that is responsive to the execution of the read request, wherein conditionally setting the adaptive read ahead data block size variable to equal the recorded data block size of data recorded on the sequential media that is responsive to the execution of the read ahead request includes: re-executing the read ahead request of the sequential media with a read ahead data block size equal to the maximum recorded data block size parameter of the variable data block size storage device in response to determining the recorded data block size of data recorded on the sequential media that is responsive to the execution of the read ahead request is greater than the setting of the adaptive read ahead data block size variable to equal the recorded data block size of data recorded on the sequential media that is responsive to the execution of the read request.

12. The system of claim 11, wherein conditionally setting the adaptive read ahead data block size variable to equal the recorded data block size of data recorded on the sequential media that is responsive to the execution of the read ahead request further includes: subsequent to the re-execution of the read ahead request of the sequential media, setting the adaptive read ahead data block size variable to equal the recorded data block size of data recorded on the sequential media that is responsive to the re-execution of the read ahead request.

13. The system of claim 12, wherein conditionally setting the adaptive read ahead data block size variable to equal the recorded data block size of data recorded on the sequential media that is responsive to the execution of the read ahead request further includes: incrementing an inaccurate prediction count subsequent to the setting of the adaptive read ahead data block size variable to equal the recorded data block size of data recorded on the sequential media that is responsive to the re-execution of the read ahead request; and retaining the setting of the adaptive read ahead data block size variable response to the incremented inaccurate prediction count being less than an inaccurate prediction threshold.

14. The system of claim 12, wherein conditionally setting the adaptive read ahead data block size variable to equal the recorded data block size of data recorded on the sequential media that is responsive to the execution of the read ahead request further includes: incrementing an inaccurate prediction count subsequent to the setting of the adaptive read ahead data block size variable to equal the recorded data block size of data recorded on the sequential media that is responsive to the re-execution of the read ahead request; and setting the adaptive read ahead data block size variable to equal the maximum recorded data block size of the variable data block size storage device in response to the incremented inaccurate prediction count being greater than an inaccurate prediction threshold.

15. A method for implementing an adaptive read ahead of a sequential media readable via a variable data block size sequential storage device, the method comprising: executing a read request of the sequential media in response to an electrical communication of the read request from a host, wherein the read request is executed with a read request data block size equal to a maximum recorded data block size parameter of the variable data block size storage device; and subsequent to the execution of the read request of the sequential media, setting an adaptive read ahead data block size variable to equal a recorded data block size of data recorded on the sequential media that is responsive to the execution of the read request subsequent to the execution of the read request of the sequential media, executing a read ahead request of the sequential media with a read ahead data block size equal to the adaptive read ahead data block size variable; and subsequent to the execution of the read ahead request of the sequential media, conditionally setting the adaptive read ahead data block size variable to equal a recorded data block size of data recorded on the sequential media that is responsive to the execution of the read ahead request, wherein conditionally setting the adaptive read ahead data block size variable to equal the recorded data block size of data recorded on the sequential media that is responsive to the execution of the read ahead request includes: retaining the setting of the adaptive read ahead data block size variable equal to the recorded data block size of data recorded on the sequential media that is responsive to the execution of the read request in response to determining the recorded data block size of data recorded on the sequential media that is responsive to the execution of the read ahead request is less than the setting of the adaptive read ahead data block size variable.

16. A method for implementing an adaptive read ahead of a sequential media readable via a variable data block size sequential storage device, the method comprising: executing a read request of the sequential media in response to an electrical communication of the read request from a host, wherein the read request is executed with a read request data block size equal to a maximum recorded data block size parameter of the variable data block size storage device; and subsequent to the execution of the read request of the sequential media, setting an adaptive read ahead data block size variable to equal a recorded data block size of data recorded on the sequential media that is responsive to the execution of the read request subsequent to the execution of the read request of the sequential media, executing a read ahead request of the sequential media with a read ahead data block size equal to the adaptive read ahead data block size variable; and subsequent to the execution of the read ahead request of the sequential media, conditionally setting the adaptive read ahead data block size variable to equal a recorded data block size of data recorded on the sequential media that is responsive to the execution of the read ahead request, wherein conditionally setting the adaptive read ahead data block size variable to equal the recorded data block size of data recorded on the sequential media that is responsive to the execution of the read ahead request includes: incrementing an inaccurate prediction count in response to determining the recorded data block size of data recorded on the sequential media that is responsive to the execution of the read ahead request is less than the setting of the adaptive read ahead data block size variable equal to the recorded data block size of data recorded on the sequential media that is responsive to the execution of the read request; and retaining the setting of the adaptive read ahead data block size variable in response to the incremented inaccurate prediction count being less than an inaccurate prediction threshold.

17. A method for implementing an adaptive read ahead of a sequential media readable via a variable data block size sequential storage device, the method comprising: executing a read request of the sequential media in response to an electrical communication of the read request from a host, wherein the read request is executed with a read request data block size equal to a maximum recorded data block size parameter of the variable data block size storage device; and subsequent to the execution of the read request of the sequential media, setting an adaptive read ahead data block size variable to equal a recorded data block size of data recorded on the sequential media that is responsive to the execution of the read request subsequent to the execution of the read request of the sequential media, executing a read ahead request of the sequential media with a read ahead data block size equal to the adaptive read ahead data block size variable; and subsequent to the execution of the read ahead request of the sequential media, conditionally setting the adaptive read ahead data block size variable to equal a recorded data block size of data recorded on the sequential media that is responsive to the execution of the read ahead request, wherein conditionally setting the adaptive read ahead data block size variable to equal the recorded data block size of data recorded on the sequential media that is responsive to the execution of the read ahead request includes: incrementing an inaccurate prediction count in response to determining the recorded data block size of data recorded on the sequential media that is responsive to the execution of the read ahead request is less than the setting of the adaptive read ahead data block size variable equal to the recorded data block size of data recorded on the sequential media that is responsive to the execution of the read request; and retaining the setting of the adaptive read ahead data block size variable in response to the incremented inaccurate prediction count being equal to an inaccurate prediction threshold.

18. A method for implementing an adaptive read ahead of a sequential media readable via a variable data block size sequential storage device, the method comprising: executing a read request of the sequential media in response to an electrical communication of the read request from a host, wherein the read request is executed with a read request data block size equal to a maximum recorded data block size parameter of the variable data block size storage device; and subsequent to the execution of the read request of the sequential media, setting an adaptive read ahead data block size variable to equal a recorded data block size of data recorded on the sequential media that is responsive to the execution of the read request subsequent to the execution of the read request of the sequential media, executing a read ahead request of the sequential media with a read ahead data block size equal to the adaptive read ahead data block size variable; and subsequent to the execution of the read ahead request of the sequential media, conditionally setting the adaptive read ahead data block size variable to equal a recorded data block size of data recorded on the sequential media that is responsive to the execution of the read ahead request, wherein conditionally setting the adaptive read ahead data block size variable to equal the recorded data block size of data recorded on the sequential media that is responsive to the execution of the read ahead request includes: re-executing the read ahead request of the sequential media with a read ahead data block size equal to the maximum recorded data block size parameter of the variable data block size storage device in response to determining the recorded data block size of data recorded on the sequential media that is responsive to the execution of the read ahead request is greater than the setting of the adaptive read ahead data block size variable to equal the recorded data block size of data recorded on the sequential media that is responsive to the execution of the read request.

19. The method of claim 18, wherein conditionally setting the adaptive read ahead data block size variable to equal the recorded data block size of data recorded on the sequential media that is responsive to the execution of the read ahead request further includes: subsequent to the re-execution of the read request of the sequential media, setting the adaptive read ahead data block size variable to equal the recorded data block size of data recorded on the sequential media that is responsive to the re-execution of the read ahead request.

20. The method of claim 19, wherein conditionally setting the adaptive read ahead data block size variable to equal the recorded data block size of data recorded on the sequential media that is responsive to the execution of the read ahead request further includes: incrementing an inaccurate prediction count subsequent to the setting of the adaptive read ahead data block size variable to equal the recorded data block size of data recorded on the sequential media that is responsive to the re-execution of the read ahead request; and retaining the setting of the adaptive read ahead data block size variable response to the incremented inaccurate prediction count being less than an inaccurate prediction threshold.

21. The method of claim 19, wherein conditionally setting the adaptive read ahead data block size variable to equal the recorded data block size of data recorded on the sequential media that is responsive to the execution of the read ahead request further includes: incrementing an inaccurate prediction count subsequent to the setting of the adaptive read ahead data block size variable to equal the recorded data block size of data recorded on the sequential media that is responsive to the re-execution of the read ahead request; and setting the adaptive read ahead data block size variable to equal the maximum recorded data block size of the variable data block size storage device in response to the incremented inaccurate prediction count being greater than an inaccurate prediction threshold.

* * * * *